O. KLUGE.
MOWING ATTACHMENT FOR MOTOR VEHICLES.
APPLICATION FILED JAN. 15, 1912.
1,092,720.
Patented Apr. 7, 1914.
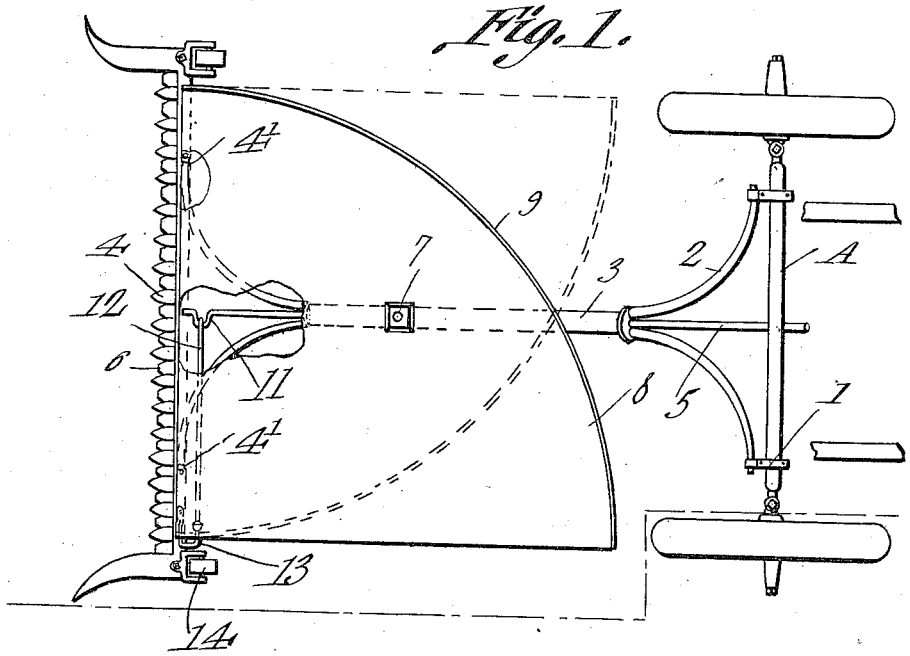
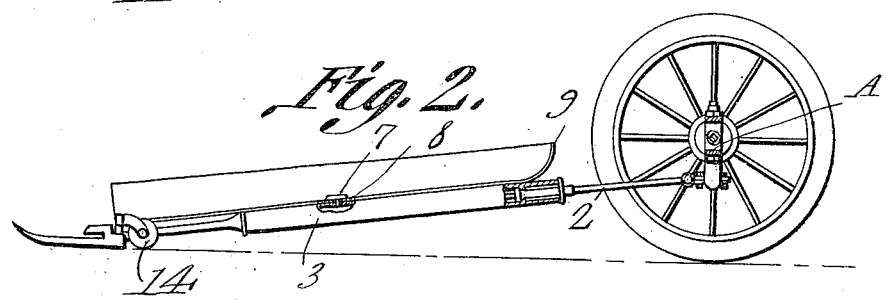
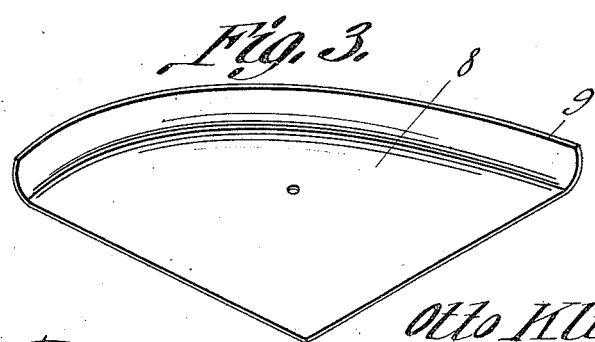
Witnesses
Otto Kluge, Inventor
by Attorneys

UNITED STATES PATENT OFFICE.

OTTO KLUGE, OF GOLCONDA, ILLINOIS.

MOWING ATTACHMENT FOR MOTOR-VEHICLES.

1,092,720. Specification of Letters Patent. Patented Apr. 7, 1914.

Application filed January 15, 1912. Serial No. 671,185.

*To all whom it may concern:*

Be it known that I, OTTO KLUGE, a citizen of the United States, residing at Golconda, in the county of Pope and State of Illinois, have invented a new and useful Mowing Attachment for Motor-Vehicles, of which the following is a specification.

This invention relates to bunching and windrowing attachments for passenger automobiles and the like, and one of its objects is to provide an attachment of this character adapted to be connected detachably to the front end of an ordinary motor vehicle whereby, when the vehicle is propelled forward, the cut vegetation will be directed toward one side of the attachment.

A further object is to provide a platform which is reversible so as to cause the cut material to discharge from either side of the machine desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the attachment, a portion of the motor vehicle to which it is secured being also shown. Fig. 2 is a side elevation of the attachment, a portion of the motor vehicle being shown in section. Fig. 3 is a perspective view of the reversible platform.

Referring to the figures by characters of reference A designates the front axle of a motor vehicle, a portion of which has been indicated at B, and this axle is adapted to be detachably engaged by clamps 1 to which are connected arms 2 swiveled at 10 to the frame 3 of the attachment. A finger bar 4 is pivotally connected as at 4' to the front end of the frame 3 and a shaft 5 is carried by the frame and is provided with mechanism such as hereinafter described for reciprocating the cutter bar 6, said shaft 5 being adapted to receive motion, through any suitable mechanism provided therefor, from the motor of the vehicle to which the attachment is secured. Mechanism for this purpose constitutes the subject matter of an application filed by me March 14, 1912, Serial No. 683,784.

A pivot stud 7 extends upwardly from the frame 3 and is engaged by a segmental platform 8 the curved or arcuate edge of which is preferably upturned, as shown at 9 so as to constitute a deflector. This platform has its straight edges preferably disposed at 90 degrees to each other and either of these straight edges is adapted to be positioned on and parallel with the finger bar 4. When thus located the platform will receive the cut material from the cutter bar and the upturned arcuate portion of the platform will deflect the material toward the straight side of the platform. The said platform can be held in place solely by means of a bolt or screw engaging the stud and the platform, as shown in Fig. 2, or can be secured in any other preferred manner. It will be apparent, by referring to the drawings, that by detaching the platform from the frame 3 it can be readily readjusted so as to discharge from the opposite side of the machine. This position of the platform has been indicated by dotted lines in Fig. 1.

The lower or front section of the shaft 5 has a crank 11 engaged by a pitman 12 which, in turn, is connected to a stem 13 secured to the cutter bar 6 near one end. Obviously, therefore, when shaft 5 is rotated reciprocatory motion will be imparted to the bar 6.

Ground wheels 14 are connected to the ends of the finger bar 4 to permit the structure to turn readily. As the finger bar is pivotally connected to frame 2 it can ride easily over uneven ground.

Other means than that shown and described may be provided for adjustably connecting the platform to the frame 3.

By reason of the swivel connection between arms 2 and frame 3 said body and the finger bar are free to tilt about the shaft 5 as an axis and thus follow the slant of the surface on which the bar is mounted.

The means herein shown for actuating the cutter bar has been disclosed in a divisional application filed by me on April 8, 1912, Serial No. 689,392.

What is claimed is:—

1. An attachment for the front of an automobile, including a frame, a finger bar extending across the front end of the frame and connected thereto, and a segmental platform having an upturned arcuate edge, said platform being pivotally mounted back of the center of the finger bar and adjustable angularly about its pivot and relative to the finger bar to discharge material from either side of the attachment.

2. An attachment for the front of an automobile, including a finger bar, a platform pivotally mounted back of the bar and adjustable angularly about its pivot and relative to the finger bar to bring either of two edges into position parallel with and back of the finger bar, said platform having a deflecting portion between said edges for directing material from the finger bar beyond either of two sides of the platform.

In testimony that I claim the foregoing as my own, I have hereto affixed my signature in the presence of two witnesses.

OTTO KLUGE.

Witnesses:
 THOS. H. CLARK,
 B. F. ANDERSON.

---

Copies of this patent may be obtained for five cents each, by addressing the "Commissioner of Patents, Washington, D. C."